(12) United States Patent
Hernandez Hernandez

(10) Patent No.: US 10,016,922 B2
(45) Date of Patent: Jul. 10, 2018

(54) MOLD FOR PRODUCING THREE-DIMENSIONAL ITEMS

(71) Applicant: SIMPLICITY WORKS EUROPE, S.L., Elche (Alicante) (ES)

(72) Inventor: Adrian Hernandez Hernandez, Monforte Del Cid (ES)

(73) Assignee: SIMPLICITY WORKS EUROPE, S.L., Elche (Alicante) (ES)

( * ) Notice: Subject to any disclaimer, the term of this patent is extended or adjusted under 35 U.S.C. 154(b) by 137 days.

(21) Appl. No.: 14/914,948

(22) PCT Filed: Aug. 29, 2014

(86) PCT No.: PCT/ES2014/070672
§ 371 (c)(1),
(2) Date: Feb. 26, 2016

(87) PCT Pub. No.: WO2015/028695
PCT Pub. Date: Mar. 5, 2015

(65) Prior Publication Data
US 2016/0221239 A1    Aug. 4, 2016

(30) Foreign Application Priority Data

Aug. 29, 2013   (ES) .............................. 201331028 U

(51) Int. Cl.
*B29C 45/17*    (2006.01)
*B29C 45/64*    (2006.01)
(Continued)

(52) U.S. Cl.
CPC .......... *B29C 45/1701* (2013.01); *B29C 33/10* (2013.01); *B29C 33/20* (2013.01);
(Continued)

(58) Field of Classification Search
CPC ............................................. B29C 2045/1745
See application file for complete search history.

(56) References Cited

U.S. PATENT DOCUMENTS 5,798,129 A * 8/1998 Megleo ................... B29C 33/20
                                                            249/168
2004/0144835 A1   7/2004 Clifford, Jr.
(Continued)

FOREIGN PATENT DOCUMENTS

JP        H11227002 A    8/1999

OTHER PUBLICATIONS

International Search Report and Written Opinion dated Nov. 17, 2014 for PCT/ES2014/070672.

*Primary Examiner* — Jill L Heitbrink
(74) *Attorney, Agent, or Firm* — Lucas & Mercanti, LLP

(57) ABSTRACT

The invention relates to a mold for producing three-dimensional items, consisting of at least two mutually attachable pieces, and within which pieces the volume of the item to be produced is delimited. In said mold, owing to the mutually supporting surfaces, said pieces have formations delimiting airtight chambers between consecutively attached pieces. At least one of the pieces used to form part of each airtight chamber has a pneumatic valve through which said chambers are connected to a vacuum source, by means of which a sufficient negative pressure is created in the chambers to fix to one another the pieces delimiting such chambers. The walls of the pieces are non-deformable as a result of the negative pressure created within the chambers.

6 Claims, 3 Drawing Sheets

(51) Int. Cl.
*B29C 33/20* (2006.01)
*B29C 33/10* (2006.01)
*B29C 33/30* (2006.01)
*B29L 31/00* (2006.01)

(52) U.S. Cl.
CPC ............ *B29C 33/301* (2013.01); *B29C 45/64* (2013.01); *B29K 2995/0037* (2013.01); *B29K 2995/0094* (2013.01); *B29L 2031/757* (2013.01)

(56) References Cited

U.S. PATENT DOCUMENTS

2012/0119423 A1* 5/2012 Rinne .................... B21D 22/10 264/570
2012/0135101 A1* 5/2012 Blanchard ............ B29C 33/305 425/522

\* cited by examiner

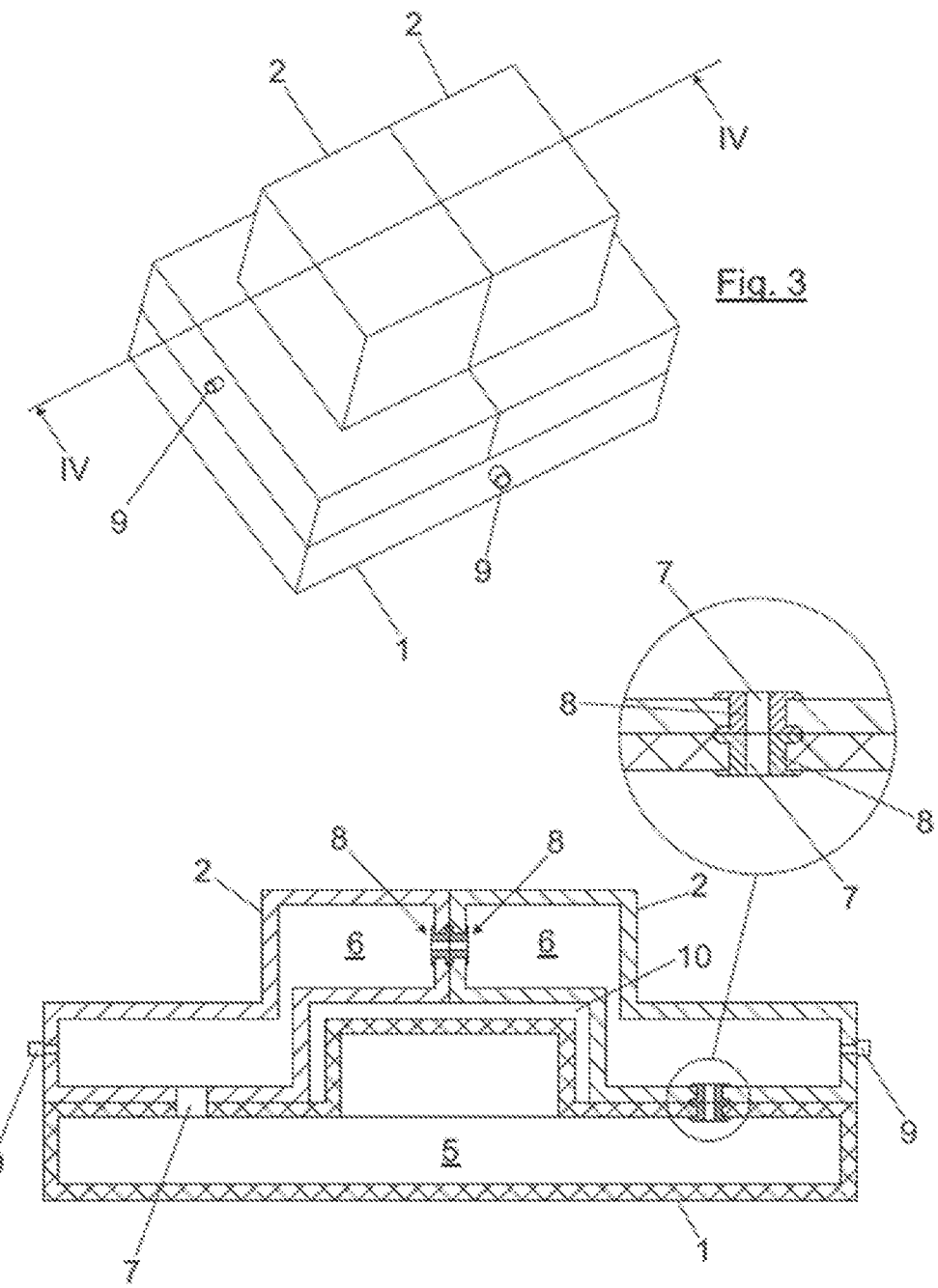

MOLD FOR PRODUCING THREE-DIMENSIONAL ITEMS

CROSS REFERENCE TO RELATED APPLICATION

This Application is a 371 of PCT/ES2014/070672 filed on Aug. 29, 2014 which, in turn, claimed the priority of Spanish Patent Application No. U201331028 filed on Aug. 29, 2013, both applications are incorporated herein by reference.

FIELD OF THE INVENTION

The present invention relates to a mold for producing three-dimensional items, consisting of at least two mutually attachable pieces, and within which pieces the volume of the item to be produced is delimited. The mold of the invention is particularly conceived for manufacturing items based on plastics.

BACKGROUND OF THE INVENTION

Molds used for producing pieces by injecting or casting plastics consist of two or more pieces, by means of the coupling of which the volume of the item to be produced is delimited between them. The pieces forming the mold are coupled and attached to one another by mechanical means which, generally, form part of the machines in which are assembled said molds.

In many cases, the molds have to be coupled on high-power machines in order to make the movements thereof, which all makes the general system for injecting or casting plastics, resins, etc., more expensive and makes it impossible to have highly flexible systems because mold changes involve high costs due to the operations and manipulations required and the machine shut-down periods.

DESCRIPTION OF THE INVENTION

The purpose of the present invention is a mold for producing three-dimensional items, particularly made of plastics, formed such that the different pieces forming them can be attached to one another based on the features of said pieces and without the intervention of the machine in which the mold for performing the injection or casting is assembled.

According to the invention, owing to the mutually supporting surfaces between pieces, said pieces forming the mold have formations delimiting airtight chambers between consecutively attached pieces, at least one of the pieces used to form part of each airtight chamber having a pneumatic valve through which the chambers are connected to a vacuum source, by means of which a sufficient negative pressure is created in said chambers to fix the pieces delimiting such chambers to one another.

The pieces forming the mold can consist of a hollow structure, each piece delimiting an airtight chamber. In this case the pieces will have opposing openings in the mutually attachable walls between consecutive pieces, through which openings the different airtight chambers are communicated with one another. These openings will be provided with sealing means between the mutually attachable walls of consecutive pieces. At least one of the pieces will have a pneumatic valve for the connection of the set of communicated chambers to a vacuum source.

According to another possible embodiment, the pieces can have, in the mutually attachable walls of consecutive pieces, opposing recesses provided with peripheral tightness means with which the airtight chambers are delimited when said pieces are attached to one another.

The recesses defining said airtight chambers could also be formed in the mold carriers of the different pieces forming the mold.

The molds will therefore consist of a conventional hollow or solid structure and constitution, and the mold carriers will be what have, on the mutually attachable surfaces of their different components, the recesses which will form the airtight chambers. Therefore, it will be the mold carriers that apply forces on molds that are required for withstanding injection pressures.

In summary, according to the invention the pieces that will form the mold are pressed against one another when the vacuum is created in the airtight chambers as a result of the atmospheric pressure acting on the outer surface of the pieces that weaken said airtight chambers.

In a preferred embodiment, the pieces forming the mold are plastic and consist of a hollow structure with rigid walls which furthermore will be non-deformable as a result of both the vacuum formed between the chambers and the pressures of the injection process.

Additionally, the molds could be provided with a mechanism that cooperates in the fixing between the pieces forming it.

Also and for the purpose of facilitating the injection process, the pieces constituting the mold could be provided, on the mutually supporting surfaces, with a coating based on a film or thin layer of a material that repels the material to be injected.

BRIEF DESCRIPTION OF THE DRAWINGS

The attached drawings show a possible embodiment given by way of non-limiting example in order to better understand the features of the invention. In the drawings:

FIG. 3 is a perspective view of the mold when it is closed, ready for producing the tray of FIG. 1 by injection.

FIG. 4 is a longitudinal section of the mold according to section line IV-IV of FIG. 3.

DETAILED DESCRIPTION OF AN EMBODIMENT

Figure 1:
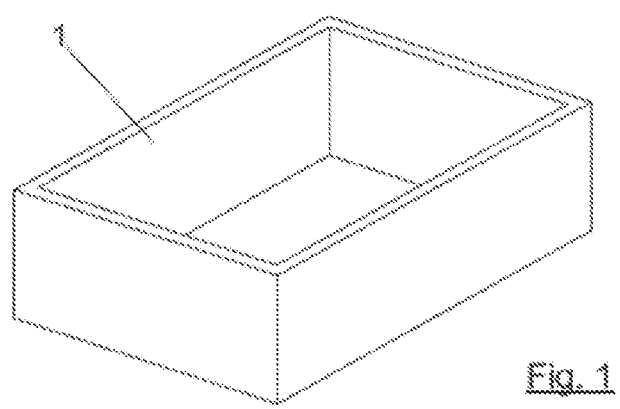
FIG. 1 shows a perspective view of a plastic tray produced by injection by means of a mold.

FIG. 1 shows a perspective view of a right rectangular prismatic tray 1 open at one of its bases, constituting the piece of plastic to be produced by injection by means of the corresponding mold.

Figure 2:
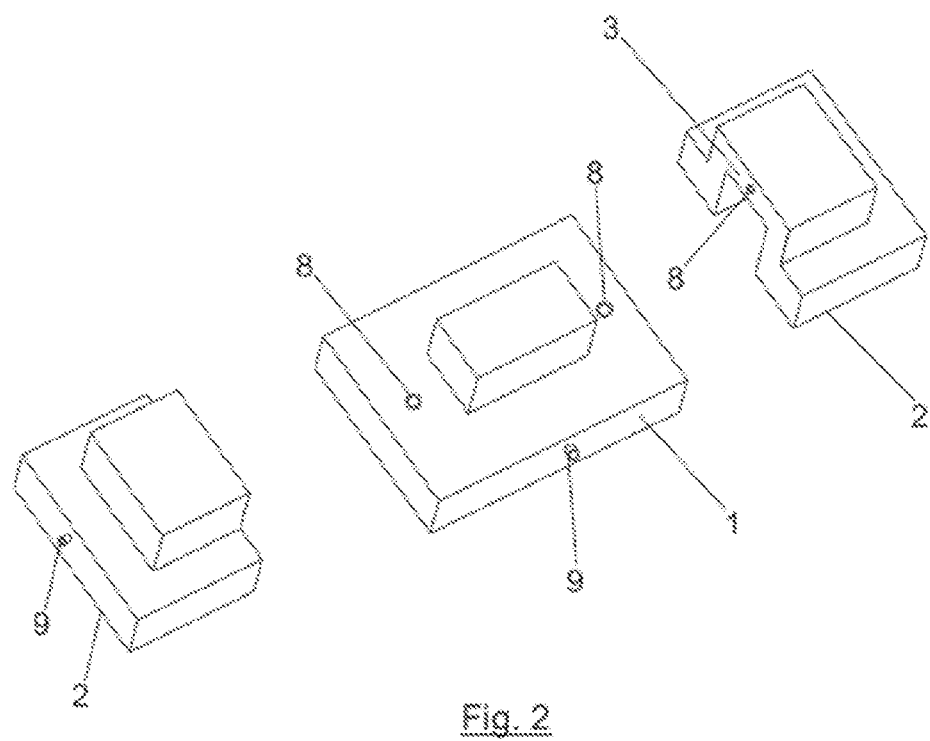
FIG. 2 shows an exploded perspective view of the mold from which the tray of FIG. 1 is produced.

FIG. 2 shows a possible constitution of the mold that allows obtaining the tray of FIG. 1. This mold is made up of a base piece (1) and two upper symmetrical pieces indicated with reference number (2). These two upper pieces are coupled on the base piece (1), attached to one another through opposing surfaces (3), obtaining an arrangement such as the one shown in FIG. 3.

According to the invention, the pieces (1 and 2) consist of a hollow structure, as can be seen in FIG. 4, and internally delimit chambers (5 and 6). Preferably, the pieces (1 and 2) consist of a plastic base and the chambers (5 and 6) could be filled with a foam material.

As shown in FIG. 4, the pieces (1 and 2) have openings (7) in the mutually attachable walls arranged in opposing position, such that when the different pieces forming the mold are attached to one another, the chambers (5 and 6) are communicated with one another through the openings (7). These openings are provided with sealing means between the attached walls, which can consist, for example, of bushings (8) made of an elastically deformable material which partially project from the openings (7) on rims which support one another to assure the tightness around two openings (7) facing, as can be seen in the detail of FIG. 4.

At least one of the pieces forming the mold will have in one of its walls a pneumatic valve (9) through which the set of chambers (5 and 6) are connected to a vacuum source, by means of which a vacuum is created within said chambers sufficient for keeping the pieces (1 and 2) strongly attached to one another.

As can be seen in FIG. 4, once the pieces (2) are assembled on the piece (1) and duly adjusted, a space (10) corresponding to the volume of the tray (1) to be produced is delimited between.

Figure 5:
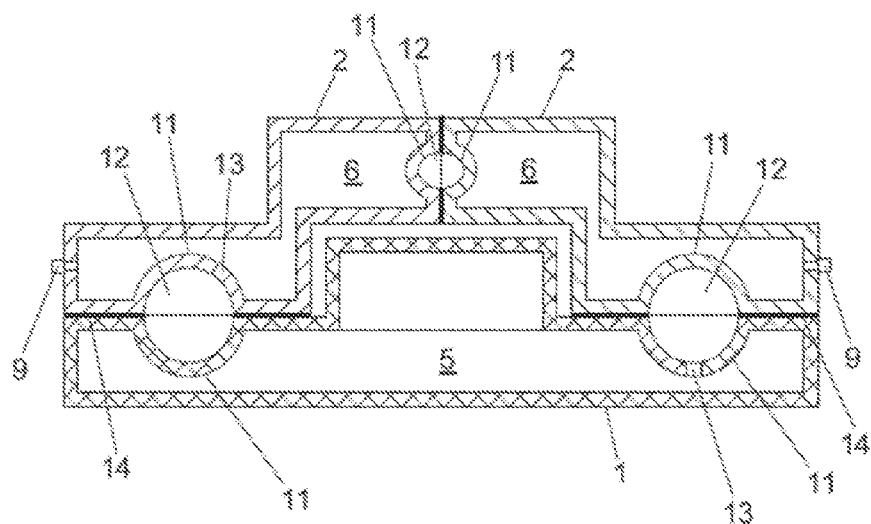
FIG. 5 is a view and similar to FIG. 4, showing an alternative embodiment.

FIG. 5 shows an embodiment variant in which the pieces (1 and 2) have, from the outer surface of the mutually attachable walls, recesses (11) located in a coinciding position, such that when said pieces are attached to one another the recesses delimit the chambers (12) which will be in communication with the inner chambers (5 and 6) through openings (13) made in the walls of the recesses (11). With this constitution, when the vacuum is created in the chambers (5 and 6), the same vacuum is produced in the chambers (12), by means of which a greater fixing effect between the different pieces forming the mold is achieved.

The mutually attachable walls of the different pieces can have on their opposing surfaces a coating (14) of an elastically deformable material that assures the seal of the chambers (12).

In the embodiment of FIG. 5, the communication between the chambers (5 and 6) could be achieved through the openings (13) of the chambers (12).

FIG. 5 shows an embodiment in which the pieces 1 and 2 forming the mold, which can be hollow or solid, have in their walls, from the mutually attachable outer surfaces, opposing recesses (11) delimiting the airtight chambers (12), which can be independent or be communicated with one another, each chamber having in any case a pneumatic valve (9) through which the vacuum will be formed therein.

Finally, it must be indicated that the chamber (12) could be defined by recesses made in mutually attachable surfaces of the mold carriers, in which case the pieces forming the mold would lack said recesses.

Due to the existence of the airtight chambers (12), when the vacuum is formed therein, as a result of the atmospheric pressure applied on the outer surface of the pieces delimiting said chambers, the pieces of the mold are pressed strongly against one another in order to withstand the pressures generated when injecting the material that will make the item to be produced.

As can be understood, the mold will be made up of two or more pieces, depending on the features of the item to be produced.

The walls limiting the chambers (5 and 6) of the pieces (1 and 2) could have an impermeable and non-deformable laminar structure both as a result of the injection pressures and due to the negative pressures that could be created in said chambers. Furthermore, these chambers (5 and 6) could be filled with a foam material, for example an open cell foam material, to assure the transmission of the vacuum between the different chambers.

The invention claimed is:

1. A mold for producing three-dimensional items comprising:
   at least two mutually attachable half pieces, each half piece comprising:
   a joint face surface,
   an external surface opposite to the joint face surface,
   a second face surface, and
   an internal hollow structure delimiting a first chamber and a second chamber, respectively,
   a first and a second opening, respectively, on the joint face surface of each half piece aligned and in communication with the internal hollow structure delimiting the chamber of the half pieces,
   wherein at least one of the two mutually detachable half pieces comprises a first pneumatic valve;
   a base piece comprising:
   an internal hollow structure delimiting a base chamber,
   an external surface having a second pneumatic valve,
   a third face surface facing the second face of each half piece,
   a third and a fourth opening on the third face surface of the base,
   a fifth and sixth opening on the second surface of each half piece, aligned, respectively, with the third and the fourth opening of the base such that the first and second chambers, respectively, are in communication with the base chamber;
   a space formed by joining the at least two mutually attachable half pieces and the base piece, wherein the three-dimensional item is formed;
   wherein the first pneumatic valve and the second pneumatic valve are connected to a vacuum source so as to create a sufficient negative pressure in the first, second and base chambers to fixedly attach the pieces together, and
   wherein the pieces are non-deformable as a result of the negative pressure created within the chambers.

2. The mold according to claim 1, wherein the different chambers delimited between all the pieces are communicated with one another in an airtight manner.

3. The mold according to claim 1, wherein said the first, second, third, fourth, fifth and sixth openings are provided with sealing means, the sealing means being bushings made of an elastically deformable material which partially project from the openings on rims which support one another to assure tightness around the openings.

4. The mold according to claim 1, wherein the half pieces and the base piece further comprises a coating based on a film or thin layer of a repellent material that repels a molding material to be injected in order to facilitate injection of the molding material into the mold.

5. A mold for producing three-dimensional items comprising:
   at least two mutually attachable half pieces, each half piece comprising:
   a joint face surface,
   an external surface opposite to the joint face surface,
   a second face surface, and
   an internal hollow structure delimiting a first chamber and a second chamber, respectively,
   a first and a second recess, respectively, on the joint face surface of each half piece aligned and in communication with the internal hollow structure delimiting the chamber of the half pieces, wherein at least one of the two mutually detachable half pieces comprises a first pneumatic valve;

a base piece comprising:
an internal hollow structure delimiting a base chamber,
an external surface having a second pneumatic valve,
a third face surface facing the second face of each half piece,
a third and a fourth recess on the third face surface of the base,
a fifth and sixth recess on the second surface of each half piece, aligned, respectively, with the third and the fourth recess of the base such that the first and second chambers, respectively, are in communication with the base chamber, a space formed by joining the at least two mutually attachable half pieces and the base piece, wherein the three-dimensional item is formed;

wherein the recesses provide peripheral tightness through airtight chambers delimited when the half pieces and base piece are attached to one another, and wherein the pieces are non-deformable as a result of the negative pressure created within the chambers.

6. The mold according to claim 5, wherein the mold further comprises a coating of an elastically deformable material in order to assure tight sealing of the airtight chambers delimited by the recesses.

* * * * *